United States Patent
Kamble et al.

(10) Patent No.: US 12,233,360 B2
(45) Date of Patent: Feb. 25, 2025

(54) LIQUID FILTER

(71) Applicant: FLEETGUARD FILTERS PRIVATE LIMITED, Pune (IN)

(72) Inventors: Shrikant Ashok Kamble, Pune (IN); Rohan Turior, Pune (IN); Satyasheel Milind Borwankar, Pune (IN); Ajay Nehra, Pune (IN)

(*) Notice: Subject to any disclaimer, the term of this patent is extended or adjusted under 35 U.S.C. 154(b) by 334 days.

(21) Appl. No.: 17/787,602

(22) PCT Filed: Dec. 23, 2020

(86) PCT No.: PCT/IB2020/062415
§ 371 (c)(1),
(2) Date: Jun. 21, 2022

(87) PCT Pub. No.: WO2021/130708
PCT Pub. Date: Jul. 1, 2021

(65) Prior Publication Data
US 2022/0410042 A1   Dec. 29, 2022

(30) Foreign Application Priority Data
Dec. 24, 2019   (IN) .............................. 201921053710

(51) Int. Cl.
*B01D 29/21* (2006.01)
*B01D 29/90* (2006.01)
*B01D 29/92* (2006.01)
*B01D 35/30* (2006.01)

(52) U.S. Cl.
CPC ............. *B01D 29/21* (2013.01); *B01D 29/90* (2013.01); *B01D 29/92* (2013.01); *B01D 35/30* (2013.01); *B01D 2201/0415* (2013.01); *B01D 2201/12* (2013.01)

(58) Field of Classification Search
None
See application file for complete search history.

(56) References Cited

U.S. PATENT DOCUMENTS

| 2011/0062061 A1 | 3/2011 | Chajec |
| 2018/0015394 A1 | 1/2018 | Muir et al. |

*Primary Examiner* — Krishnan S Menon

(57) ABSTRACT

In one or more embodiments, a liquid filter 100 to filter fuel or lubricant is provided. The liquid filter 100 includes a housing 102 extending along the vertical axis XX'. The housing 102 has a cylindrical shape and includes a top end cap 104 and a bottom end cap 106 provided at both ends. The top end cap 104 and the bottom end cap 106 are integratedly formed in one piece with the housing 102. The top end cap 104 includes an outlet 108 for allowing outflow of filtered liquid from the housing 102. A hand priming pump 110 is functionally attached to the outlet 108 of the top end cap 104 for easing priming. The bottom end cap 106 includes an inlet 112 for allowing inflow of dirty liquid inside the housing 102.

9 Claims, 4 Drawing Sheets

LIQUID FILTER

TECHNICAL FIELD

The present invention relates generally to the field of liquid filters, and more specifically, to a liquid filter with axial inlet flow and axially opposite outlet flow.

BACKGROUND

Liquids often carry particulate matters or impurities within them. In many instances, it is desirable to partially or completely remove these impurities from the liquid. For example, any fuel being used for power supply or any lubricant being used for heat and wear management. The impurities, should they reach the internal workings of the various mechanisms involved, can cause substantial damage thereto. It is therefore preferred, for such systems, to remove impurities from the fuel/lubricant before supplying them.

The design of a liquid filter must fulfill the filtration quality criteria set by the user and the rate of filtration criteria required by the various mechanisms. The most challenging design problem which affects the efficiency of the liquid filters is the layout of the flow connections. Typically, flow (inlet and outlet) connections of the liquid filter are found to be either from the top, from the bottom, or side along with top or bottom of the filter volume.

Traditionally, filters having foregoing flow connections may not cater to such applications where flow is in axial direction of filter with opposite need of openings. Similarly, liquid filters with conventional designs may hamper functionalities such as flow to filter, resistance to normal flow, priming requirements etc. in situations where flow is in axial direction of filter with opposite need of openings. Also, drawing fuel in axial flow situation is affected severely because of least fuel contained condition within housing of the filter.

Therefore, there is a need for a more cost and energy efficient liquid filter which can maintain consistent delivery in those applications where flow connections (inlet & outlet) are in axial direction of filter with opposite need of openings.

SUMMARY

Before the present invention relating to liquid filter for fuel or lubricant filtration are described, it is to be understood that this application is not limited to the particular system(s) and methodologies described, as there can be multiple possible embodiments which are not expressly illustrated in the present disclosure. It is also to be understood that the terminology used in the description is for the purpose of describing the implementations or versions or embodiments only and is not intended to limit the scope of the present invention. This summary is provided to introduce aspects related to a liquid filter for fuel or lubricant filtration. This summary is not intended to identify essential features of the claimed subject matter nor is it intended for use in determining or limiting the scope of the present invention.

In one embodiment, a liquid filter for fuel or lubricant filtration is provided. The liquid filter includes a housing having a hollow interior, a first open end forming a filter inlet to allow the ingress of unfiltered fluid, and a second open end forming a filter outlet to allow the egress of filtered fluid. The liquid filter further includes a pleated filter block placed within the hollow interior of the housing. The pleated filter block having a hollow interior cavity wherein the hollow interior cavity of the pleated filter block having a suction tube and a pickup tube placed therein. In this respect, the pickup tube includes an inlet and an outlet such that the inlet of the pickup tube is coupled to the first open end of the housing to allow the passage of unfiltered fluid from the inlet to the outlet. Further, the suction tube includes an inlet and an outlet, wherein the inlet is placed within the hollow interior cavity of the pleated filter block and the outlet of the suction tube is coupled to the second open end of the housing such that the inlet of the suction tube allows the passage of filtered fluid from the hollow interior cavity of the pleated filter block to the filter outlet.

In another embodiment, a liquid filter for fuel or lubricant filtration is provided. The liquid filter includes a housing extending along an axis and defining an interior. The housing includes a top end cap including an outlet for filtered liquid, and a bottom end cap including an inlet for dirty liquid. The liquid filter further includes a center tube positioned centrally in the interior of the housing and extending along the axis. The center tube includes a pickup tube integrated inside the center tube and extending from the inlet of the bottom end cap to near the top of the housing for permitting axial inward flow of dirty liquid. The center tube further includes a suction tube integrated inside the center tube and extending from near the bottom of the center tube for drawing filtered liquid and supplying to the outlet of the top end cap. Further, the center tube includes a holding structure integratedly surrounding both the pickup tube and the suction tube, and defining an exterior wall configured to allow flow of the filtered liquid inside the center tube from surroundings. Furthermore, the liquid filter includes a pleated filter block configured to attach to the holding structure and surround the center tube such that dirty side is facing the housing for receiving the inward flow of dirty liquid from near the top of the housing, and clean side is facing the exterior wall of the holding structure.

In another embodiment, the pleated filter block has a cylindrical or frustoconical shape.

In yet another embodiment, the outer side of the pleated filter block is a dirty side of the pleated filter block.

In yet another embodiment, the inner side of the pleated filter block is a clean side of the pleated filter block.

In yet another embodiment, the pleated filter block is configured to removably attach to the holding structure.

In yet another embodiment, the pleated filter block is a spin-on type pleated filter block.

In yet another embodiment, the top end cap, which can also be referred as "first open end", and the bottom end cap, which can also be referred as "second open end", of the housing are integratedly formed in one piece with the housing.

BRIEF DESCRIPTION OF THE ACCOMPANYING DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific system/apparatus or method disclosed in the document and the drawings.

Figure 1:
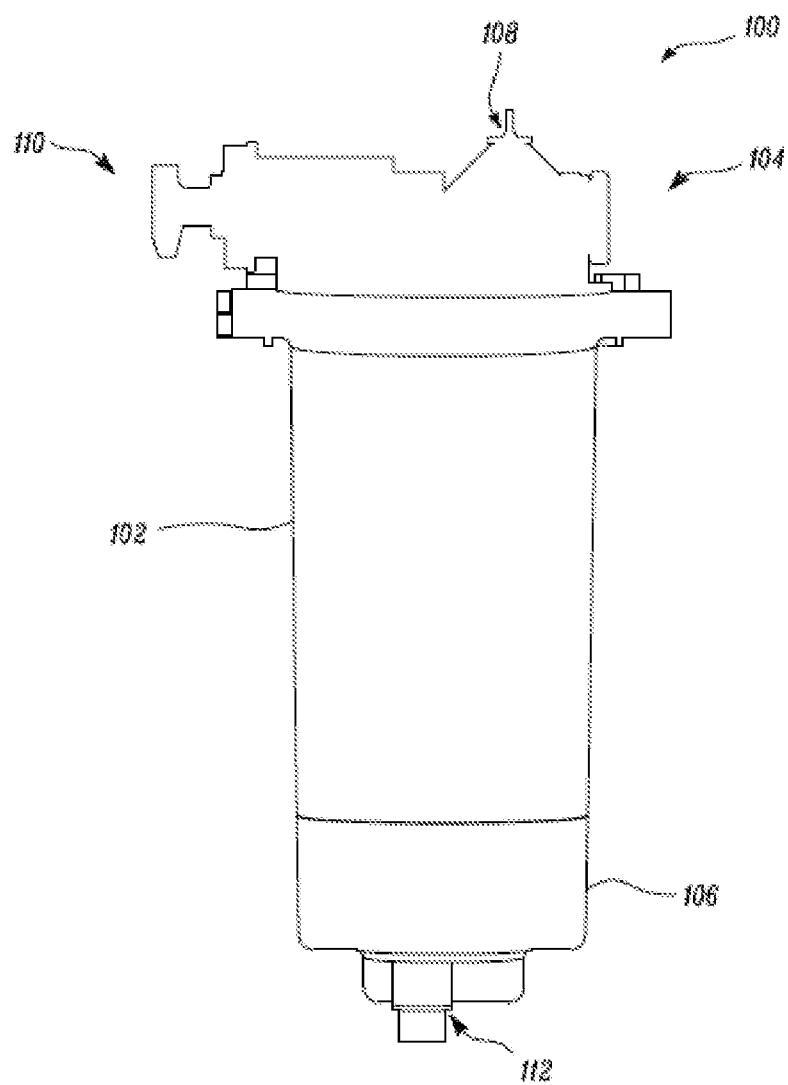
FIG. 1 is a perspective view of a liquid filter, in accordance with an embodiment of the present subject matter.

In the above accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

Further, the figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although a liquid filter for fuel or lubricant filtration, similar or equivalent to those described herein can be used in the practice or testing of embodiments of the present disclosure, the exemplary, liquid filter for fuel or lubricant filtration is now described.

In one aspect, embodiments of the present disclosure provide a liquid filter with axial inlet flow and axially opposite outlet flow. In another aspect, embodiments of the present disclosure provide a method of assembling a liquid filter with axial inlet flow and axially opposite outlet flow. In yet another aspect, embodiments of the present disclosure provide a method of servicing a liquid filter with axial inlet flow and axially opposite outlet flow.

The liquid filter includes a housing having a hollow interior, a first open end forming a filter inlet to allow the ingress of unfiltered fluid, and a second open end forming a filter outlet to allow the egress of filtered fluid. The liquid filter further includes a pleated filter block placed within the hollow interior of the housing.

The pleated filter block having a hollow interior cavity wherein the hollow interior cavity of the pleated filter block having a suction tube and a pickup tube placed therein.

In this respect, the pickup tube includes an inlet and an outlet such that the inlet of the pickup tube is coupled to the first open end of the housing to allow the passage of unfiltered fluid from the inlet to the outlet. Further, the suction tube includes an inlet and an outlet, wherein the inlet is placed within the hollow interior cavity of the pleated filter block and the outlet of the suction tube is coupled to the second open end of the housing such that the inlet of the suction tube allows the passage of filtered fluid from the hollow interior cavity of the pleated filter block to the filter outlet.

In another embodiment, a liquid filter for fuel or lubricant filtration is provided. The liquid filter includes a housing extending along an axis and defining an interior, a center tube positioned centrally in the interior of the housing and extending along the axis, and a pleated filter block configured to surround the center tube.

The housing includes a top end cap, which can also be referred as "first open end", with an outlet for filtered liquid and a bottom end cap, which can also be referred as "second open end", with an inlet for dirty liquid. The first open end and the second open end of the housing are integratedly formed in one piece with the housing.

The center tube includes a pickup tube integrated inside the center tube, a suction tube integrated inside the center tube, and a holding structure integratedly surrounding both the pickup tube and the suction tube. The pickup tube extends from the inlet of the bottom end cap to near the top of the housing for permitting axial inward flow of the dirty liquid. The suction tube extends from near the bottom of the center tube to the outlet of the top end cap for drawing and supplying filtered liquid. The holding structure defines an exterior wall configured to allow flow of the filtered liquid inside the center tube from surroundings.

The description of above mentioned two different embodiments provides a clarity on the subject matter that the center tube is not an essential part of the claimed liquid filter. The option of the center tube can be easily eliminated by having a hollow interior cavity in the pleated filter block. Thus, hollow interior cavity of the pleated filter block can easily accommodate a suction tube and a pickup tube which are placed therein.

With the description of the above-mentioned different embodiments, it is to be noted that the present disclosure substantially eliminates, or at least partially address, problems in the prior art, and assist the filter manufacturers, consumers and suppliers.

Further, various modifications to the embodiment will be readily apparent to those skilled in the art and the generic principles herein may be applied to other embodiments.

Referring now to the drawings, particularly by their reference numbers, FIG. 1 is a perspective view of a liquid filter 100 to filter fuel or lubricant, in accordance with an embodiment of the present claimed subject matter. The liquid filter 100 includes a housing 102 extending along the vertical axis XX'. As may be seen, the housing 102 has a cylindrical shape and includes a top end cap 104, which can also be referred as "first open end", and a bottom end cap 106, which can also be referred as "second open end", provided at both ends.

In an embodiment, the top end cap 104 and the bottom end cap 106 are integratedly formed in one piece with the housing 102. The top end cap 104 includes an outlet 108 for allowing outflow of filtered liquid from the housing 102. In an embodiment, a hand priming pump 110 is functionally attached to the outlet 108 of the top end cap 104 for easing priming. The bottom end cap 106 includes an inlet 112 for allowing inflow of dirty liquid inside the housing 102. Further, it is to be noted that that the FIG. 1 merely an example. A person skilled in the art will recognize many variations, alternatives, and modifications of the embodiments of the present claimed subject matter.

Figure 2:
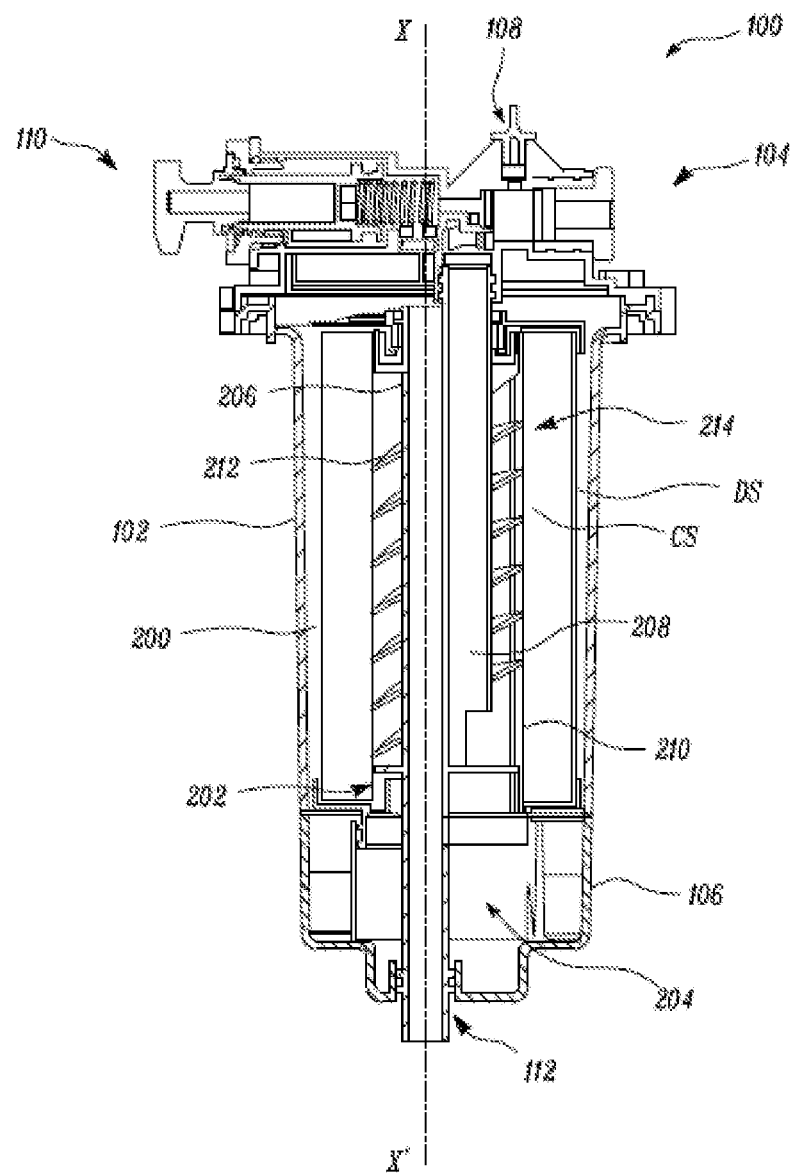
FIG. 2 is a cross-sectional illustration of the liquid filter in an assembled state, in accordance with an embodiment of the present subject matter.

FIG. 2 depicts cross-section of the liquid filter 100 in an assembled state, in accordance with an embodiment of the present claimed subject matter. Two different types of arrows are used to depict inflow of dirty liquid and outflow of filtered liquid. In an embodiment, the liquid filter 100 includes the housing 102 extending along the vertical axis XX' and defining an interior 200 between the top end cap 104 (first open end) and the bottom end cap 106 (second open end). As depicted, a center tube 202 is positioned centrally in the interior 200 of the housing 102 about a pivot region 204 of the bottom end cap 106. The center tube 202 extends along said axis XX' upto the top end cap 104.

The center tube 202 includes a pickup tube 206 integrated inside the center tube 202. The pickup tube 206 extends from the inlet 112 of the bottom end cap 106 to near the top of the housing 102 for permitting axial inward flow of the dirty liquid, according to an embodiment of the present disclosure. As shown, the center tube 202 includes a suction tube 208 integrated inside the center tube 202. The suction tube 208 extends from near the bottom of the center tube 202 to the outlet 108 of the top end cap 104 for drawing and supplying filtered liquid, in accordance with an embodiment of the present disclosure. As depicted further, the center tube 202 includes a holding structure 210 integratedly surrounding both the pickup tube 206 and the suction tube 208.

In an embodiment, the holding structure 210 defines an exterior wall 212 configured to allow flow of the filtered liquid inside the center tube 202 from surroundings. In an embodiment, the exterior wall 212 has a helical shape.

As depicted in the present embodiment, the liquid filter 100 includes a pleated filter block 214. The pleated filter block 214 is attached to the holding structure 210 in a manner such that dirty side DS is facing the housing 102 for receiving the inward flow of dirty liquid from near the top of the housing 102. Further, clean side CS of the pleated filter block 214 faces the exterior wall 212 of the holding structure 210.

In another embodiment, the pleated filter block 214 is a spin-on type pleated filter block. In yet another embodiment, the pleated filter block 214 has a cylindrical or frustoconical shape.

In yet another embodiment, the outer side of the pleated filter block 214 is a dirty side DS of the pleated filter block 214.

In yet another embodiment, the inner side of the pleated filter block 214 is a clean side CS of the pleated filter block 214.

In yet another embodiment, the pleated filter block 214 is configured to removably attach to the holding structure 210.

Further, it is to be noted that that the FIG. 2 merely an example. A person skilled in the art will recognize many variations, alternatives, and modifications of the embodiments of the present claimed subject matter.

Figure 3:
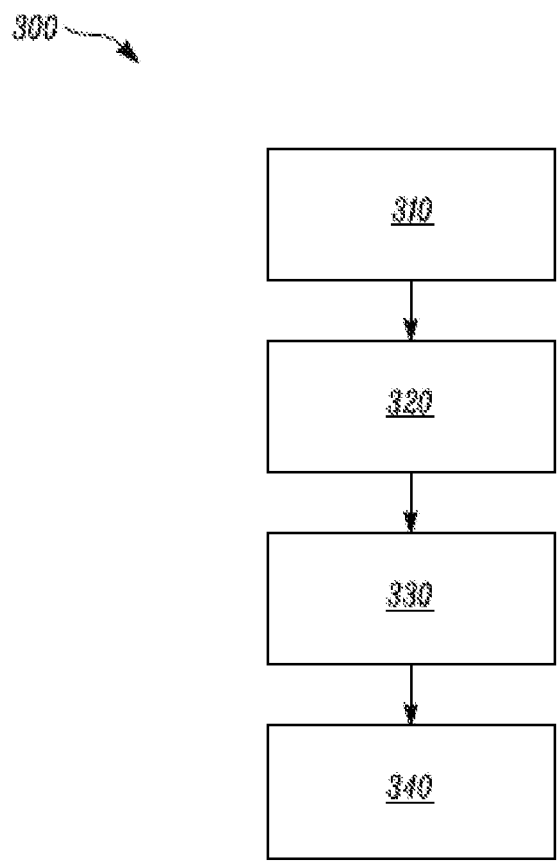
FIG. 3 illustrates a method flow-chart depicting various steps in assembling the liquid filter, in accordance with an embodiment of the present subject matter.

FIG. 3 illustrates a flow-chart depicting various steps for a method 300 of assembling the liquid filter 100, in accordance with the embodiments of the present claimed subject matter.

As shown, the method 300 of assembling the liquid filter 100 includes a first step 310 of arranging the center tube 202 along the axis XX' of the housing 102 such that the pickup tube 206 and the suction tube 208 are sealingly integrated with the bottom end cap 106. The method 300 includes a second step 320 of locking the center tube 202 about the pivot region 204 of the bottom end cap 106. In an embodiment, the center tube 202 is locked by rotating about the pivot region 204 of the bottom end cap 106. The method 300 also includes a third step 330 of attaching the pleated filter block 214 to the holding structure 210 such that the pleated filter block 214 surrounds the center tube 202, and the dirty side DS is facing the housing 102 and clean side CS is facing the center tube 202. The method 300 further includes a fourth step 340 of applying force to an exposed portion of the housing 102 for locking the top end cap 104 and the bottom end cap 106 into sealing engagement with the housing 102.

Figure 4:
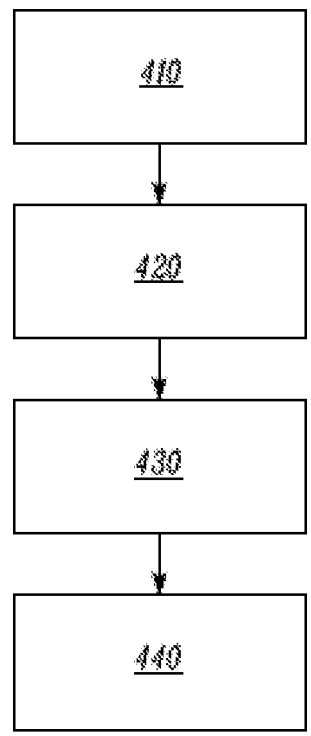
FIG. 4 illustrates a method flow-chart depicting steps required in servicing the liquid filter, in accordance with an embodiment of the present subject matter.

FIG. 4 illustrates a flow-chart depicting various steps for a method 400 of servicing the liquid filter 100, in accordance with the embodiments of the present claimed subject matter.

As shown, the method 400 of servicing the liquid filter 100 includes a first step 410 of applying force to an exposed portion of the housing 102 for unlocking the top end cap 104 from the housing 102. The method 400 includes a second step 420 of separating the pleated filter block 214 surrounding the holding structure 210. The present method 400 also includes a third step 430 of attaching a replacement pleated filter block (not shown) to the holding structure 210 such that the replacement pleated filter block surrounds the center tube 202, and the dirty side DS is facing the housing 102 and clean side CS is facing the center tube 202. The method 400 further includes a fourth step 440 of applying force to an exposed portion of the housing 102 for locking the top end cap 104 into sealing engagement with the housing 102.

With reference to FIG. 4 and according to an alternative embodiment, the method 400 of servicing the liquid filter 100 may include a first step 410 of applying force to an exposed portion of the housing 102 for unlocking the bottom end cap 106 from the housing 102. The method 400 includes a second step 420 of separating the pleated filter block 214 surrounding the holding structure 210. The alternative embodiment of the method 400 also includes a third step 430 of attaching a replacement pleated filter block (not shown) to the holding structure 210 such that the replacement pleated filter block surrounds the center tube 202, and the dirty side DS is facing the housing 102 and clean side CS is facing the center tube 202. The method 400 further includes a fourth step 440 of applying force to an exposed portion of the housing 102 for locking the bottom end cap 106 into sealing engagement with the housing 102.

Further, it is to be noted that the embodiments of the present disclosure can be used for various purposes, including, though not limited to, manufacturing and servicing of liquid filters.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Although implementations for manufacturing and servicing of liquid filters have been described in language specific to structural features and/or methods, it is to be understood that the appended claims are not necessarily limited to the specific features or methods described. Rather, the specific features and methods are disclosed as examples of implementations for manufacturing and servicing of liquid filters.

The invention claimed is:
1. A liquid filter comprising:
  a housing having a hollow interior, a first open end forming a filter inlet to allow the ingress of unfiltered fluid, and a second open end forming a filter outlet to allow the egress of filtered fluid,
  a pleated filter block placed within the hollow interior of the housing, wherein the pleated filter block having a hollow interior cavity;

wherein the hollow interior cavity of the pleated filter block having a suction tube and a pickup tube placed therein;

wherein the pickup tube having an inlet and an outlet such that the inlet of the pickup tube is coupled to the first open end of the housing to allow the passage of unfiltered fluid from the inlet to the outlet;

wherein the suction tube having an inlet and an outlet wherein the inlet is placed within the hollow interior cavity of the pleated filter block and the outlet of the suction tube is coupled to the second open end of the housing such that the inlet of the suction tube allows the passage of filtered fluid from the hollow interior cavity of the pleated filter block to the filter outlet.

2. The liquid filter as claimed in claim 1, wherein the first open end and the second open end are integratedly formed in one piece with the housing.

3. The liquid filter as claimed in claim 1, wherein the outer side of the pleated filter block is a dirty side of the pleated filter block.

4. The liquid filter as claimed in claim 1, wherein the inner side of the pleated filter block is a clean side of the pleated filter block.

5. The liquid filter as claimed in claim 1, wherein the pleated filter block is configured to removably attach to a holding structure.

6. The liquid filter as claimed in claim 1, wherein the pleated filter block is a spin-on type pleated filter block.

7. The liquid filter as claimed in claim 1, wherein the pleated filter block has a cylindrical shape.

8. The liquid filter as claimed in claim 1, wherein the pleated filter block has a frustoconical shape.

9. A liquid filter comprising:
   a housing extending along an axis and defining an interior, the housing including:
      a top end cap including an outlet for filtered liquid, and
      a bottom end cap including an inlet for dirty liquid;
   a center tube positioned centrally in the interior of the housing and extending along said axis, the center tube comprising:
   a pickup tube integrated inside the center tube and extending from the inlet of the bottom end cap to near the top of the housing for permitting axial inward flow of dirty liquid,
   a suction tube integrated inside the center tube and extending from near the bottom of the center tube for drawing filtered liquid and supplying to the outlet of the top end cap, and
   a holding structure integratedly surrounding both the pickup tube and the suction tube, and defining an exterior wall configured to allow flow of the filtered liquid inside the center tube from surroundings; and
   a pleated filter block configured to attach to the holding structure and surround the center tube such that dirty side is facing the housing for receiving the inward flow of dirty liquid from near the top of the housing, and clean side is facing the exterior wall of the holding structure.

* * * * *